United States Patent
Ma

(10) Patent No.: US 10,018,452 B1
(45) Date of Patent: Jul. 10, 2018

(54) TOY DART

(71) Applicant: Alex Brands Buzz Bee Toys (HK) Limited, Kowloon (HK)

(72) Inventor: Chor-Ming Ma, Kowloon (HK)

(73) Assignee: Alex Brands Buzz Bee Toys (HK) Limited, Kowloon (HK)

( * ) Notice: Subject to any disclaimer, the term of this patent is extended or adjusted under 35 U.S.C. 154(b) by 0 days.

(21) Appl. No.: 15/435,344

(22) Filed: Feb. 17, 2017

Related U.S. Application Data

(63) Continuation-in-part of application No. 15/402,767, filed on Jan. 10, 2017.

(30) Foreign Application Priority Data

Jan. 6, 2017 (HK) .................................... 17100179

(51) Int. Cl.
| | |
|---|---|
| *A63B 65/02* | (2006.01) |
| *F42B 6/00* | (2006.01) |
| *B29C 45/43* | (2006.01) |
| *F42B 6/08* | (2006.01) |
| B29K 105/04 | (2006.01) |
| B29L 31/52 | (2006.01) |

(52) U.S. Cl.
CPC .............. *F42B 6/003* (2013.01); *B29C 45/43* (2013.01); *F42B 6/08* (2013.01); *B29K 2105/04* (2013.01); *B29L 2031/5209* (2013.01)

(58) Field of Classification Search
CPC .................................. F42B 6/003; F42B 6/08
USPC .................. 473/572, 578, 581, 582
See application file for complete search history.

(56) References Cited

U.S. PATENT DOCUMENTS

| | | | | |
|---|---|---|---|---|
| 1,918,718 A * | 7/1933 | Samsel | ................... | F42B 6/003 273/DIG. 25 |
| 2,683,037 A * | 7/1954 | Ruczynski | .............. | F42B 6/003 42/99 |
| 3,801,102 A * | 4/1974 | Lohr | ....................... | F42B 6/003 29/450 |
| 5,928,049 A * | 7/1999 | Hudson | ................ | A63H 27/004 446/15 |
| 5,944,006 A * | 8/1999 | Moore | ................... | F41B 11/642 124/65 |
| 6,083,127 A * | 7/2000 | O'Shea | .................... | A63H 33/18 446/213 |
| 7,364,521 B2 * | 4/2008 | Yang | ...................... | A63B 65/02 248/206.2 |
| 7,775,918 B2 * | 8/2010 | Tsang | ........................ | F42B 6/10 473/572 |
| 7,861,657 B2 * | 1/2011 | Danon | .................... | F42B 12/34 102/502 |

(Continued)

*Primary Examiner* — Alexander Niconovich

(57) ABSTRACT

The invention relates to a dart head for a toy dart, comprising a body having a hollow stem portion integrally formed with and longitudinally extending from an enlarged, hollow head portion; the head portion and the stem portion being fluidly connected, with the head portion defining at least one first transverse internal head dimension, and the stem portion defining at least one first transverse internal stem dimension; wherein the at least one first transverse internal head dimension is larger than the at least one first transverse internal stem dimension. The invention also relates to a toy dart comprising a dart body connectable with the dart head as described, and a method of manufacturing the dart head as described.

13 Claims, 24 Drawing Sheets

(56) References Cited

U.S. PATENT DOCUMENTS

| | | | |
|---|---|---|---|
| 8,012,049 B1* | 9/2011 | Walterscheid | F42B 6/08 473/572 |
| 8,852,038 B1* | 10/2014 | Hyde | F42B 6/04 473/578 |
| 8,968,126 B2* | 3/2015 | Chia | F42B 6/08 473/578 |
| 9,285,194 B2* | 3/2016 | Chia | F42B 12/34 |
| 2004/0069177 A1* | 4/2004 | Klein | F42B 12/36 102/502 |
| 2006/0014598 A1* | 1/2006 | Martin | F42B 6/08 473/578 |
| 2006/0046877 A1* | 3/2006 | Gajda, Jr. | F42B 6/10 473/572 |
| 2009/0309307 A1* | 12/2009 | Leal | A63B 63/00 273/348.4 |
| 2014/0274501 A1* | 9/2014 | Chang | F42B 6/003 473/582 |
| 2015/0018144 A1* | 1/2015 | Chia | F42B 12/34 473/582 |

* cited by examiner

TOY DART

This application is a continuation-in-part utility patent application claiming priority to U.S. patent application Ser. No. 15/402,767 filed Jan. 10, 2017, and which is incorporated by reference herein for all purposes.

FIELD OF THE INVENTION

The invention relates to a toy projectile and, particularly, but not exclusively, to a foam dart for use in a toy such as a toy gun.

BACKGROUND OF THE INVENTION

A large variety of toy launchers for projectiles such as bullets, darts, arrows or the like are available in the market. Among the various designs, a foam dart, which typically comprises a shaft or a body made of foam material connecting with a rigid head portion, has been gaining increasing popularity among both children and adult players due to their light weight and relatively low risk of injury especially when compared with the traditional darts which are very often formed of hard, solid plastic materials. Particularly, toy foam darts have been designed with functional features in order to improve aerodynamic flight properties, safety, as well as to enhance user's experience during a play.

OBJECTS OF THE INVENTION

An object of the present invention is to provide a novel foam dart for use with a toy.

Another object of the present invention is to provide a toy dart with a reduced or cushioned force of impact on a target to thereby enhance safety.

A further object of the present invention is to mitigate or obviate to some degree one or more problems associated with known toy projectiles, or at least to provide a useful alternative.

The above objects are met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a dart head for a toy dart. The toy dart comprises a body having a hollow stem portion integrally formed with and longitudinally extending from an enlarged, hollow head portion; the head portion and the stem portion being fluidly connected, with the head portion defining at least one first transverse internal head dimension, and the stem portion defining at least one first transverse internal stem dimension; wherein the at least one first transverse internal head dimension is larger than the at least one first transverse internal stem dimension.

In a second main aspect, the invention provides a toy dart comprising a dart body connectable with the dart head in accordance with the first main aspect.

In a third main aspect, the invention provides a method of manufacturing the dart head according to the first main aspect. The method comprises the steps of providing a male mold and a female mold; injecting a flowable polymer between the male mold and the female mold; solidifying the polymer between the male mold and the female mold to form a molded polymer; separating the female mold from the molded polymer; resiliently expanding the molded polymer to form an expanded molded polymer, the expanded molded polymer having at least one internal cavity with a size larger than the male mold; and detaching the molded polymer from the male mold dart head to form a molded polymer dart head.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
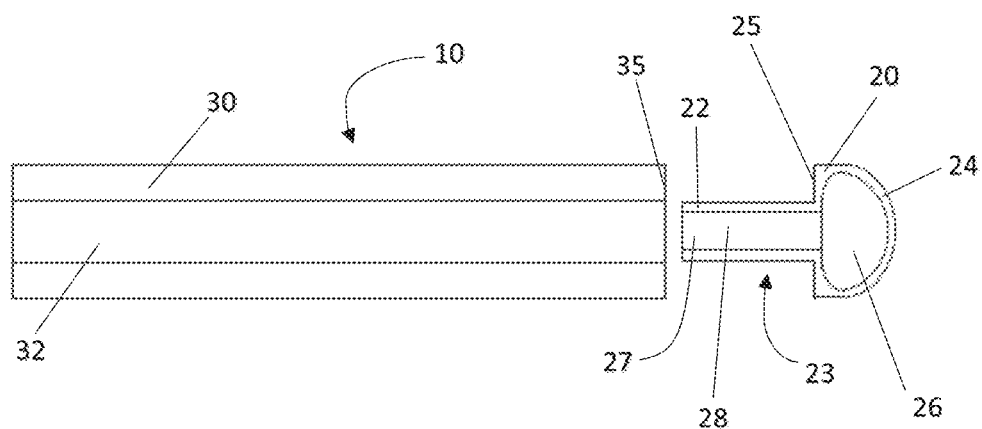
FIG. 1A shows a dart head and a dart body for a toy dart according to an embodiment of the present invention prior to connection.
Figure 1B:
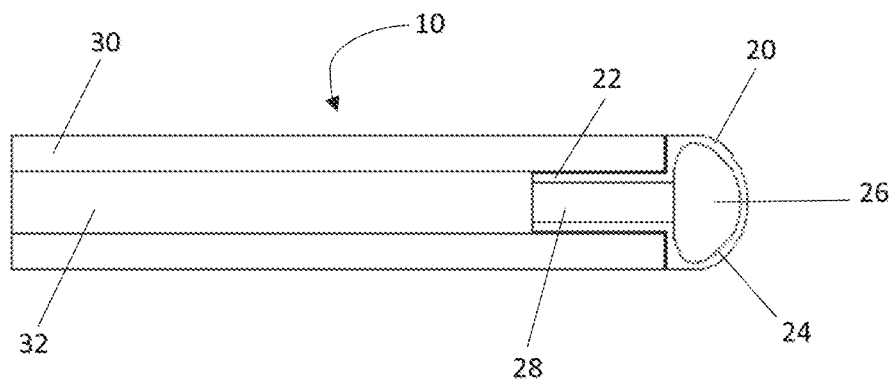
FIG. 1B shows the dart head and the dart body of FIG. 1A after connection to form a toy dart.
Figure 2A:
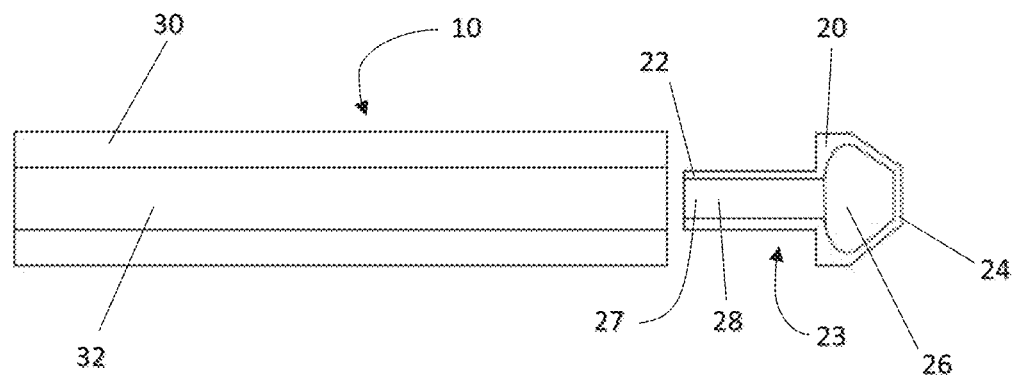
FIG. 2A shows a dart head and a dart body for a toy dart according to a second embodiment of the present invention prior to connection.
Figure 2B:
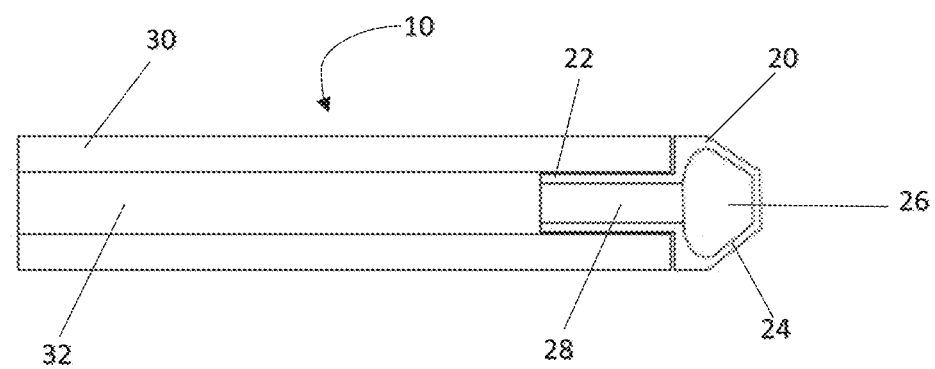
FIG. 2B shows the dart head and the dart body of FIG. 2A after connection to form a toy dart.
Figure 3A:
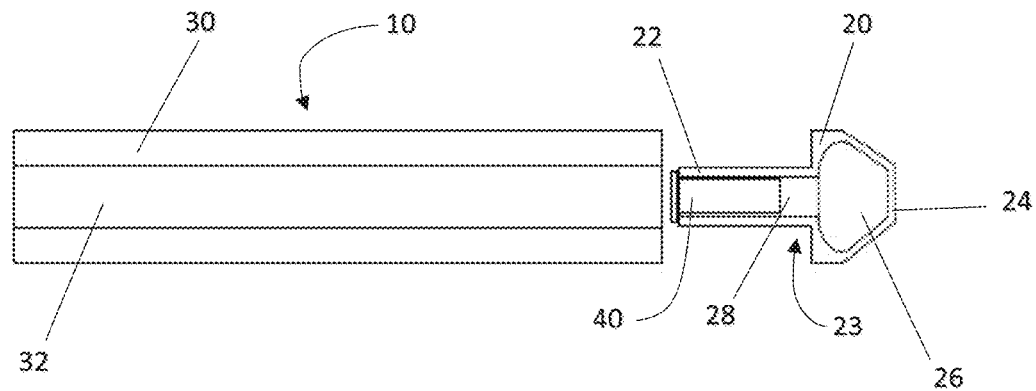
FIG. 3A shows a dart head, an insert and a dart body for a toy dart according to a third embodiment of the present invention prior to connection.
Figure 3B:
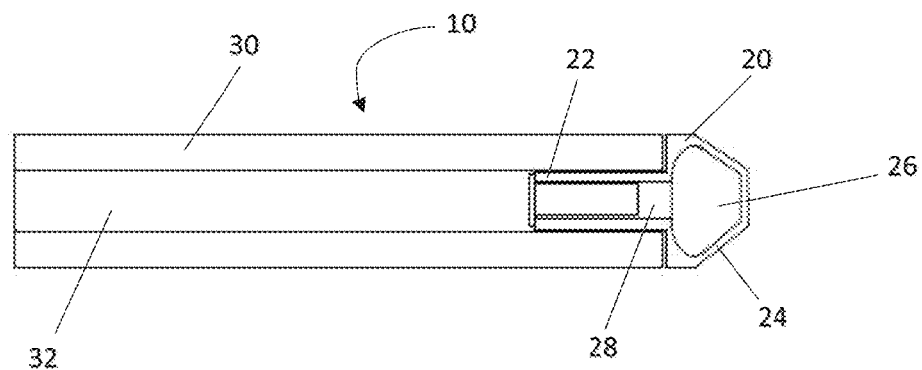
FIG. 3B shows the dart head, the insert and the dart body of FIG. 3A after connection to form a toy dart.
Figure 4A:
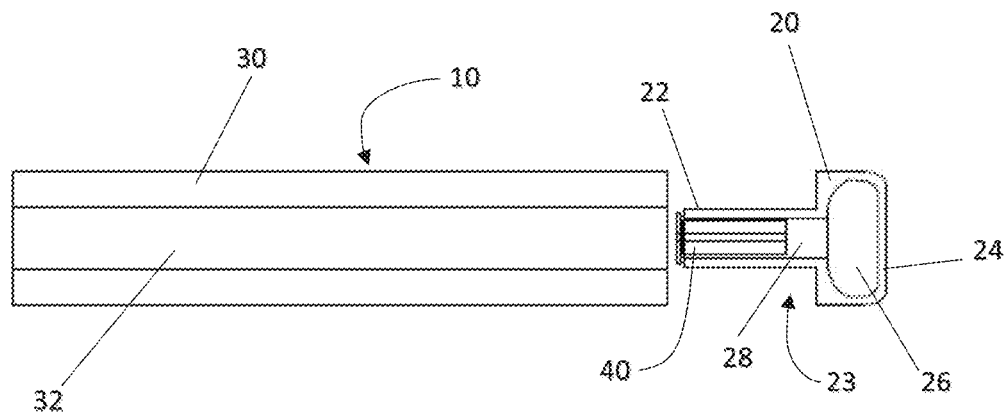
FIG. 4A shows a dart head, an insert and a dart body for a toy dart according to a fourth embodiment of the present invention prior to connection.
Figure 4B:
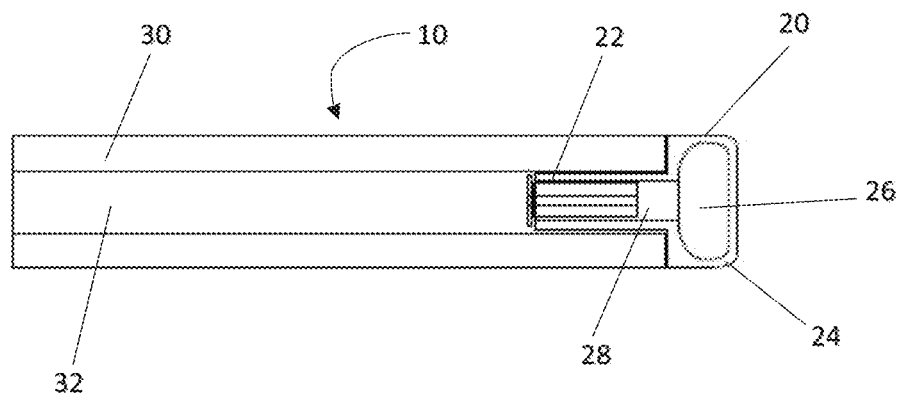
FIG. 4B shows the dart head, the insert and the dart body of FIG. 4A after connection to form a toy dart.

Referring to FIGS. 1A and 1B, shown is an embodiment of the toy dart 10 according to the present invention. The toy dart 10 may comprise a dart body 30 connectable with a dart head 20. In one embodiment, the dart head 20 is receivably connectable with the dart body 30 via an at least partially hollow, bore portion 32 of the dart body 30. Preferably, the dart body 30 is formed of at least one foam material such as, but not limited to, polyurethane, polyethylene, polystyrene or melamine foams, etc.

In this embodiment, the bore portion 32 of the dart body 30 extends the length of the dart body 30, although it needs not do so. The bore portion 32 of the dart body 30 is adapted to receive at least partially a stem portion 22 of the dart head 20 to thereby connect the dart body 30 with the dart head 20. Specifically, the dart head 20 comprises a body 23 having an enlarged head portion 24 integrally formed with the stem portion 22. The stem portion 22 is configured to longitudinally extend from the head portion 24. The head portion 24 is hollow to define at least one head cavity 26. In the context of this description, the expression "integrally formed" relates to a continuous material formation of the dart head body 23 having the head portion 24 and the stem portion 22 in a single piece, without the need of joining, adhering or any other form of connecting the head portion 24 and the stem portion 22 together after the respective head and stem portions are formed together.

In one embodiment, the stem portion 22 is also at least partially hollow to define at least one stem cavity 28, such that the at least one head cavity 26 of the hollow head portion 24 and the at least one stem cavity 28 of the hollow stem portion 22 can be arranged to be in a continuous, fluid communication. The dart head 20 is open at a rear end opening 27 of the stem portion 22 to form an undercut.

As shown in FIGS. 1A and 1B, the head portion 24 can be configured substantially in a hemispherical shape, with a flat, head base portion 25 adapted to abut a leading edge 35 of the dart body 30. The stem portion 22 is adapted to be snugly received by the bore portion 32 of the dart body 30 when the dart head 20 is arranged to connect with the dart body 30. FIGS. 2A and 2B, 3A and 3B, 4A and 4B, and 5A and 5B further show a number of embodiments of the dart head 20 in alternative configurations such as, but not limited to, in a shape of a conical frustum (see FIGS. 2A and 2B; 3A and 3B, and 5A and 5B), or cylindrical shape (see FIGS. 4A and 4B). The shape of the dart head is found to contribute to the flight performance of the resulting foam dart. For example, a dart with a cylindrically-shaped dart head is capable of achieving higher stability and thus better accuracy during shooting. While a dart with a conical frustum-shaped dart head may be able to fly further in air and thus a longer shooting distance due to the reduced forward-facing surface for air friction, but it is found to be less stable than the dart with a cylindrical dart head. This may be attributed to the relatively larger side pushing force or air dragging effect by the tapered wall of the conical frustum-shaped dart head during the flight.

The dart head 20 may optionally comprise an insert 40 adapted to be received in the hollow stem portion 22 of the dart head body 23. Specifically, the insert 40 is configured to be received and to extend at least partially along a length of the hollow stem portion 22. For example, FIGS. 3A and 3B, and 4A and 4B show the arrangement of the hollow stem portions 22 being partially filled by the respective inserts 40 starting from their rear end openings 27.

Figure 5A:
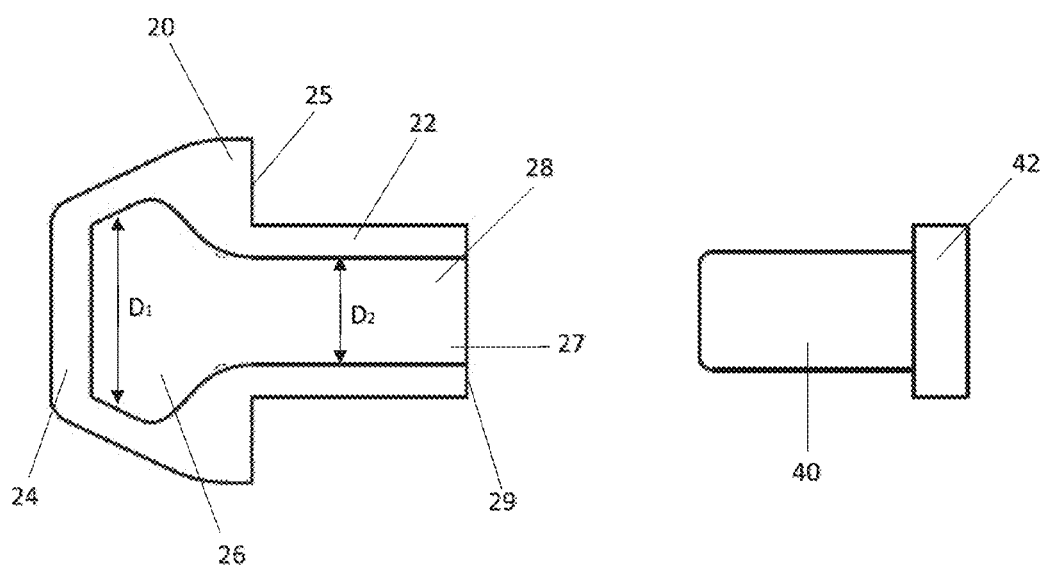
FIG. 5A shows a dart head and an insert for a toy dart according to a fifth embodiment of the present invention prior to connection.
Figure 5B:
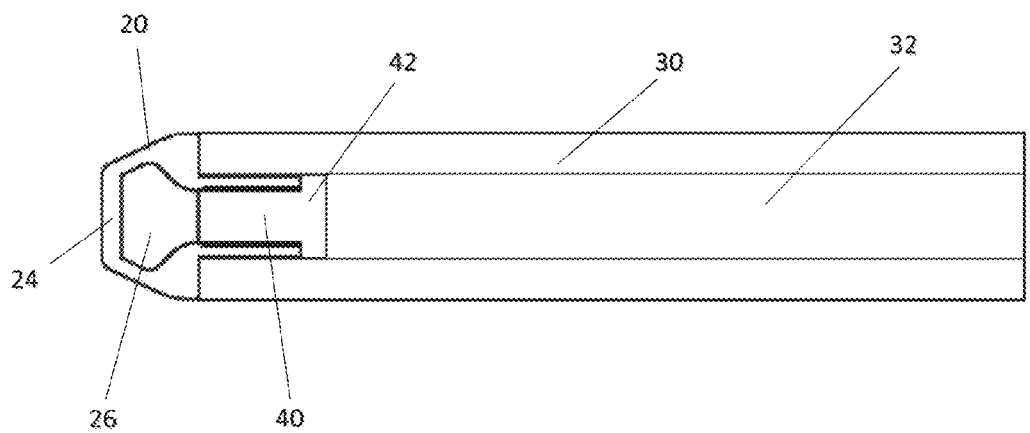
FIG. 5B shows the dart head, the insert of FIG. 5A and the dart body after connection to form a toy dart.

FIGS. 5A and 5B further show the arrangement of the hollow stem portion 22 as being substantially filled by the insert 40 along its length. The insert 40 can be solid or at least partially hollow, as shown in FIGS. 3A, 3B and 4A, 4B, respectively. Preferably, the insert 40 may comprise a weight member to provide additional weight to the dart 10 to thereby adjust or customize the flight performance of the dart. For example, a higher accuracy can be achieved by a relatively heavier dart due to its being less susceptible to the interfering air flow, but also a lower speed or acceleration of the dart due to its weight. However, a dart with lighter weight will be more susceptible to the surrounding air friction which not only results in lower shooting accuracy but also a shorter shooting distance. In one specific embodiment, it is found that a foam dart 10 with the dart body 30 having an external diameter of about 12 mm to about 13 mm, a length of the dart 10 of about 6 cm to 8 cm, and an overall weight of about 0.9 gram to 1.2 gram achieves a good balance between shooting distance, stability and thus shooting accuracy, although a person skilled in the art would appreciate that any variations and/or customizations to the configuration and/or dimension of the dart shall be encompassed, as long as they are considered suitable and applicable to the present invention without departing from the inventive concept.

In one embodiment, the insert 40 may provide additional support to the hollow stem portion 22 thereby assisting and/or improving engagement and/or adhesion between the outer wall surface of the stem portion 22 of the dart head 20 and the inner wall surface of the bore portion 32 of the dart body 30.

As more clearly shown in FIGS. 5A and 5B, the insert 40 may comprise a flange 42 at an end distal to the dart head 20. When the insert 40 is received into the cavity 28 of the stem portion 22, the flange 42 is adapted to abut the annular end wall 29 of the rear end opening 27 of the stem portion 22 to thereby position the insert 40 at or adjacent the open end 27, with the head portion 24 remaining hollow.

Figure 6:
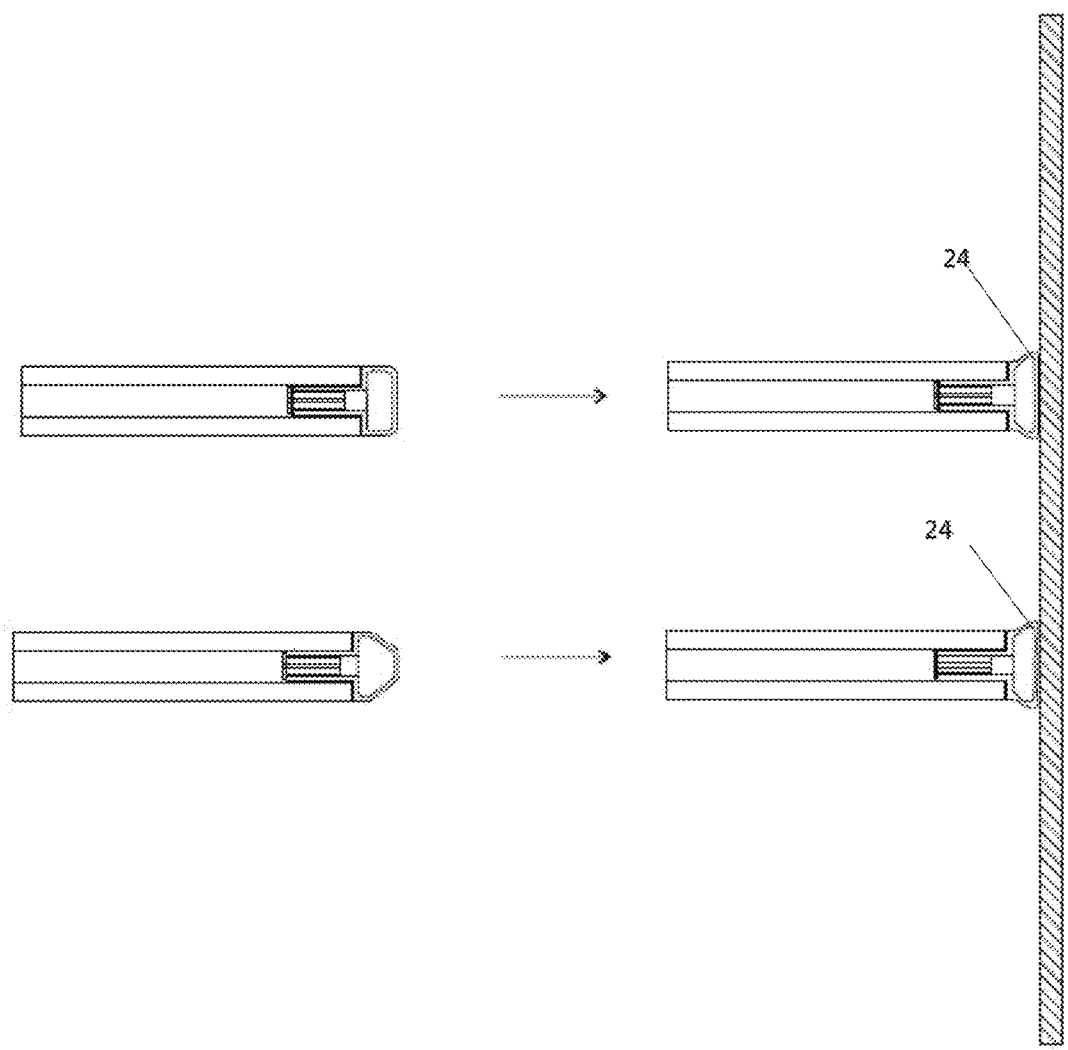
FIG. 6 shows the deformation of the embodied dart heads according to the present invention upon impact on a surface.

Particularly, the hollow head portion 24 is of sufficient resiliency such that, upon impact on a surface such as a target, the head portion 24 is adapted to resiliently deform, flatten or collapse to thereby increase the area of contact, i.e. the impact surface between the head portion 24 of the dart 10 and the target, as shown in the examples of FIG. 6. The increase in impact area due to the deformed or flattened head portion 24 is particularly advantageous in reducing the force of impact on the target struck by the dart, which significantly enhances the safety of the game. The deformation of the head portion 24 during an impact cushions the blow of the dart on the impact surface. The fluid communication between the head cavity 26 and the hollow stem portion 22 enhances the cushioning effect even in the case where the hollow stem portion has received a weighted insert 40. Where the weighted insert 40 also has a longitudinally extending bore, the diameter of this bore may be selected to exercise a degree of control on the rate of the cushioning effect by controlling the rate of fluid communication between the head cavity 26 and the hollow stem portion 22.

Preferably, the hollow head portion 24 may define at least one first transverse internal head dimension ($D_1$) of the head cavity 26, and the hollow stem portion 22 defines at least one first transverse internal stem dimension ($D_2$) of the stem cavity 28, with the first transverse internal head dimension ($D_1$) being larger than the first transverse internal stem dimension ($D_2$), as shown in FIG. 5A. This preferred configuration is found to facilitate the deformation of the head portion 24 for increasing the contact surface area with the target during an impact. The volume of the head cavity 26 is preferably larger than the volume of the bore or cavity in the hollow stem portion 22.

Figure 7:
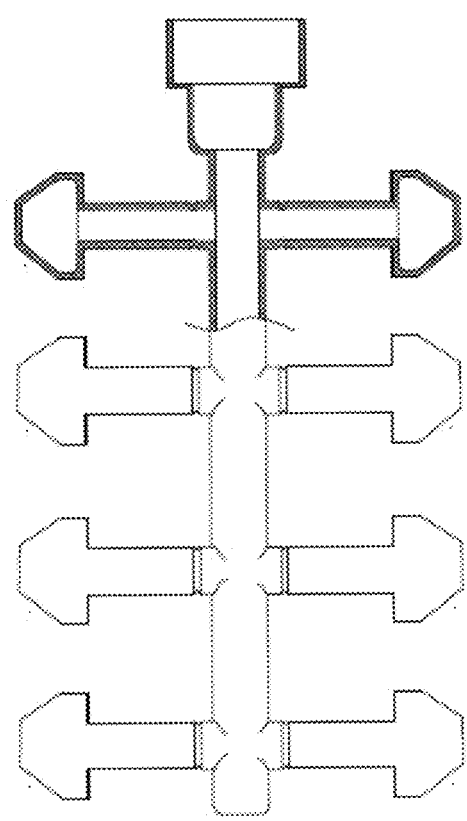
FIG. 7 shows a method of manufacturing a dart head according to an embodiment of the present invention.
Figure 8:
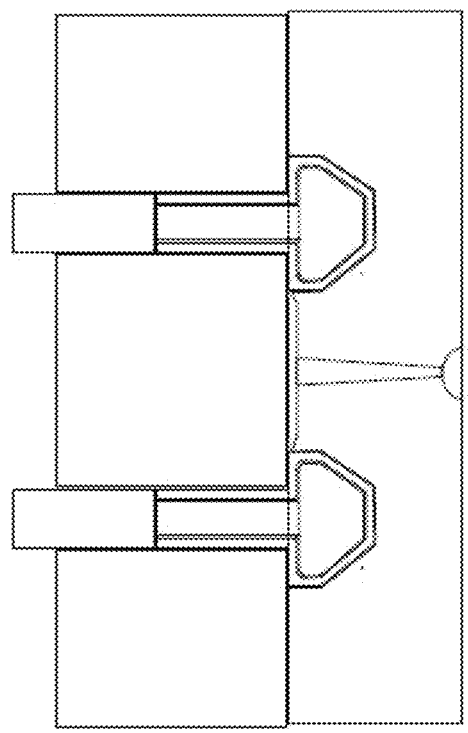
FIG. 8 shows another method of manufacturing a dart head according to an embodiment of the present invention.
Figure 9A:
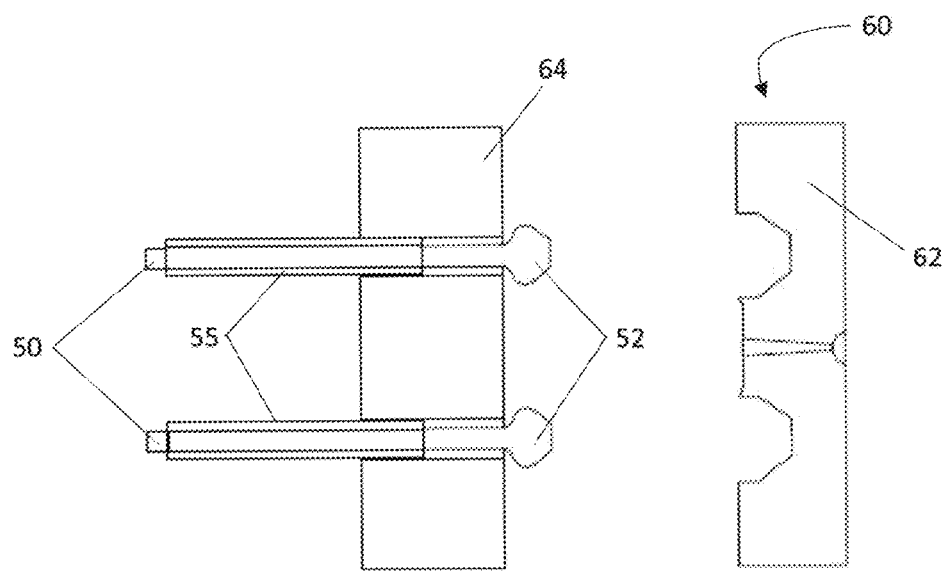
FIG. 9A to FIG. 9G show the method steps of manufacturing a dart head according to a further embodiment of the present invention.

The head portion 24 can be formed of one or more resilient polymeric materials such as, but not limited to, polyurethane foams, poly(ethylene-vinyl acetate), polyvinyl chloride, resins and/or a mixture thereof. In one embodiment, the integrally formed body 23 of the dart head 20 can also be is formed by molding of the one or more of these resilient polymeric materials, for example, blow molding, injection molding, roto-casting (also known as rotational molding) or the like. Examples of blow molding and injection molding of the dart heads are shown in FIGS. 7 and 8, respectively. FIGS. 9A to 9G illustrate an exemplified injection molding method for manufacturing the dart head of the present invention. Referring to FIG. 9A, shown is the step of providing a male mold 50 and a female mold 60 having at least a first female mold part 62 and a second female mold part 64. In this embodiment, the male mold 50 is movably connected at the second female mold part 64, and preferably, the male mold 50 is at least partially received at the second female mold part 64 and is slidably movable in a direction back and forth relative to the first female mold part 62.

The male mold 50 may comprise at least one male mold member 52. In this embodiment, the male mold member 52 preferably comprises an enlarged head connected with an elongated stem. The enlarged head is configured to conform substantially in shape with the first female mold part 62, and the elongated stem is configured to conform substantially in shape with the second female mold 64 part for molding the dart head.

Figure 9B:
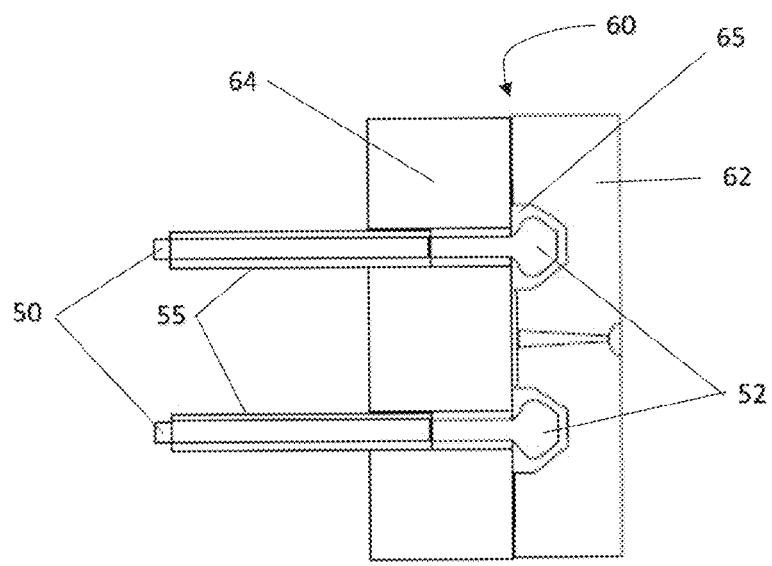
Figure 9C:
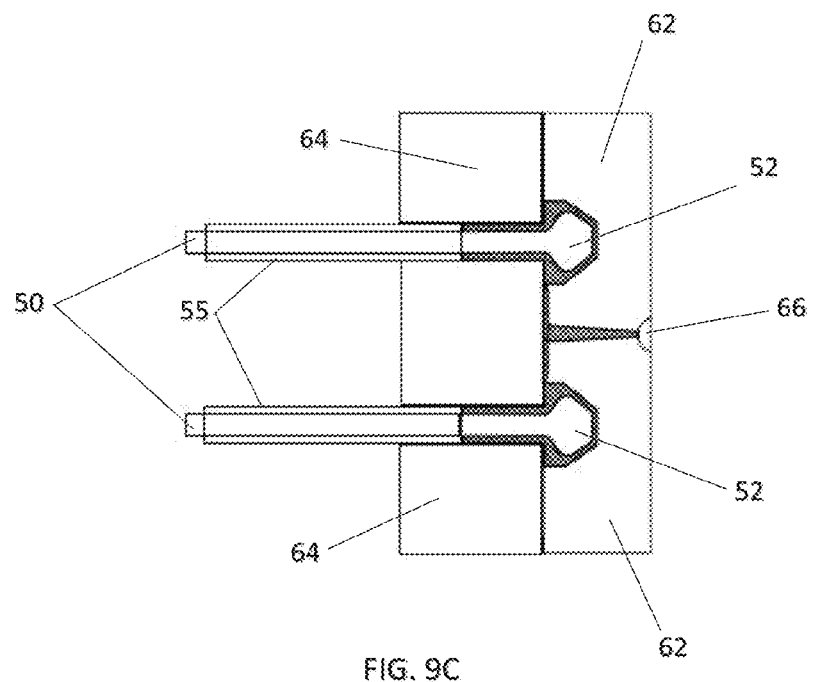

To begin the molding process, the first and the second female mold parts 62, 64 are brought to a close position which allows the male mold member 52 to be substantially encased within a molding cavity 65 defined by the first and the second female mold parts 62, 64, as shown in FIG. 9B. Subsequently, a flowable polymer is injected into the cavity 65 between the male and the female molds 50, 60 via an inlet 66, as shown in FIG. 9C. The polymer will flow over the male mold member 52 and eventually fill up the cavity 65 to integrally form the dart head 20 having the hollow enlarged head portion 24 and the hollow stem portion 22 having an undercut opening 27 at the end of the stem portion 22.

The flowable polymer can be one or more of the resilient polymeric materials as described above, such as, but not limited to, polyurethane foams, poly(ethylene-vinyl acetate), polyvinyl chloride, resins and/or a mixture thereof in their melted or solution form. A person skilled in the art would appreciate that the present invention should not be limited to the described examples of the flowable or resilient polymeric materials, but any other flowable or resilient materials which is considered applicable and suitable for the present application, should also be encompassed.

Figure 9D:
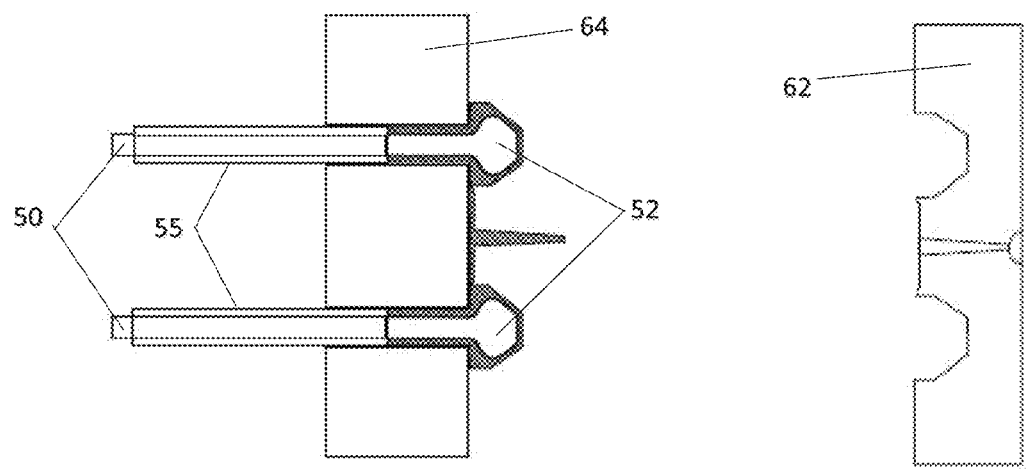
Figure 9E:
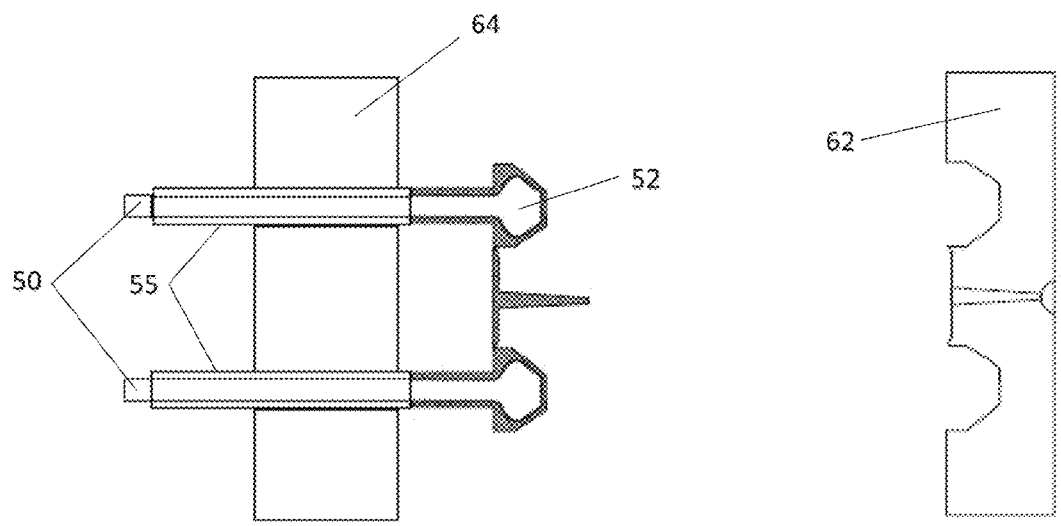
Figure 9F:
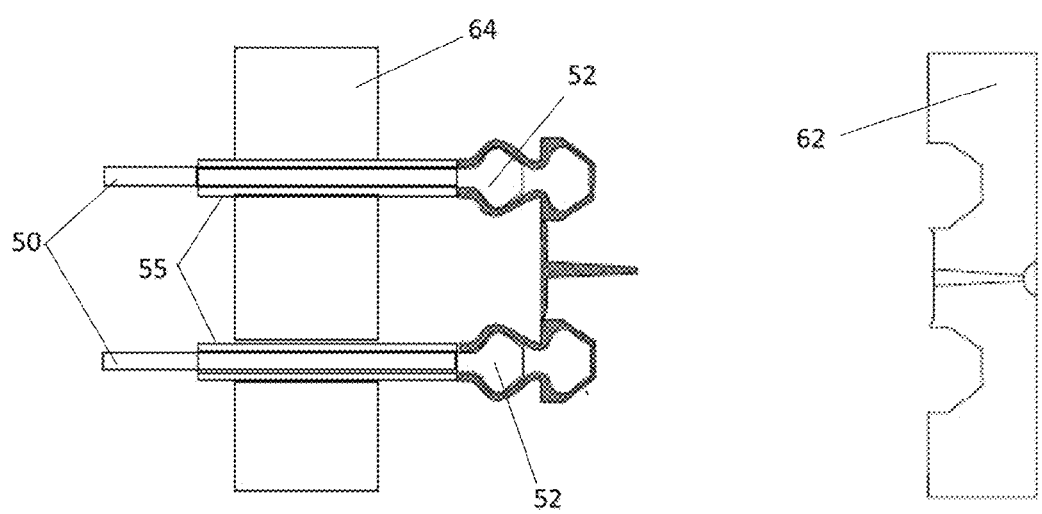
Figure 9G:
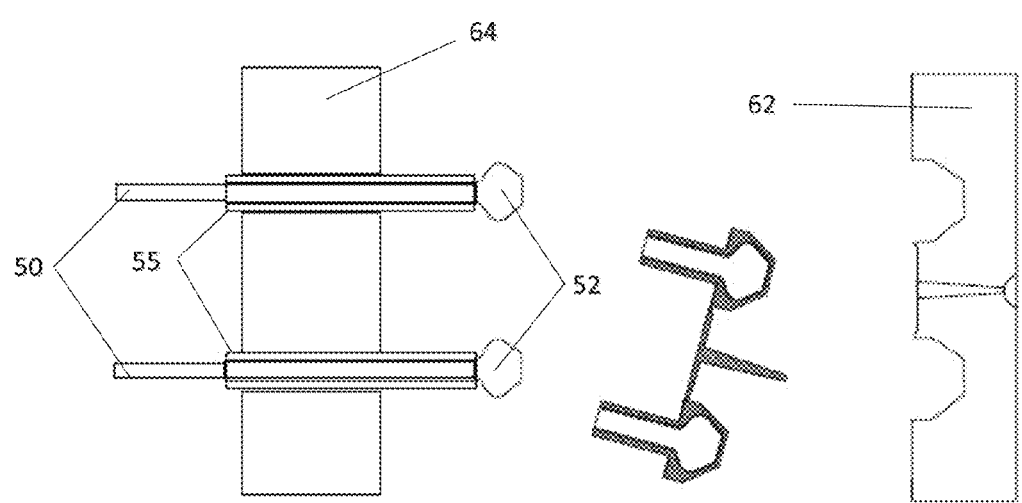

After the polymer is solidified between molds 50, 60, the second female mold part 64 and the male mold 50 will be moved away from the first female mold part 62. As the solidified, molded polymer is retained at the male mold member 52 of the male mold 50, the movement of the second female mold part 64 away from the first female mold part 62 will thus separate the molded polymer from the first female mold part 62, as shown in FIG. 9D. Alternatively, this step may also be performed by moving the first female mold part 62 away from the male mold 50 and the second female mold part 64. The molded polymer can then be mechanically released or discharged from the second female mold part 64 and the male mold member 52 of the male mold 50.

Preferably, the mechanically releasing step can be conducted in a two-steps process. First, with the second female mold part 64 remains stationary, the male mold 50, which has been movably engaged at the second female mold part 64, can be arranged to slide forward and away from the second female mold part 64 to disengage the molded polymer from the second female mold part 64. Alternatively, the male mold 50 may remain stationary but with the second female mold part 64 moving backward and away from the male mold member 52 to thereby disengage the molded polymer from the second female mold part 64, see FIG. 9E.

The male mold 50 preferably comprises a pushing means 55 adapted to mechanically push the molded polymer off of the mold member 52 of the male mold 50. In one embodiment, the pushing means 55 is sleevably arranged at an end of the elongated stem of the male mold member 52, with its leading end abutting the open end 27 of the molded, polymer dart head. In the second step, the pushing means 55 will be arranged to move towards the molded polymer to thereby mechanically push it off of the male mold member 52 over the open end 27, see FIGS. 9F and 9G. It is important that the molded polymer is of sufficient resiliency such that the molded dart head 20, especially the narrow stem portion 22 and the undercut opening 27, is resilient enough to deform to thereby slide or pass over the enlarged head of the male mold member 52 (see FIG. 9F), such that it can be released from the male mold 50 upon the mechanical pushing by the pushing member 55 without breaking apart. The molded polymer should also be resilient enough to restore its original molded shape after the release (see FIG. 9G). It is also found that a male mold member 52 having an enlarged head with rounded corners will facilitate the mechanical releasing process.

FIGS. 10A to 10G illustrates a similar process to that of FIGS. 9A to 9G, with the two-steps of mechanically releasing the molded polymer being assisted by an electric solenoid, by way of example, although a person skilled in the art would understand that the mechanical pushing or releasing can also be achieved by some other known means, such as, but not limited to, pneumatic, hydraulic and/or motor systems as well as other mechanical linkages.

Figure 10A:
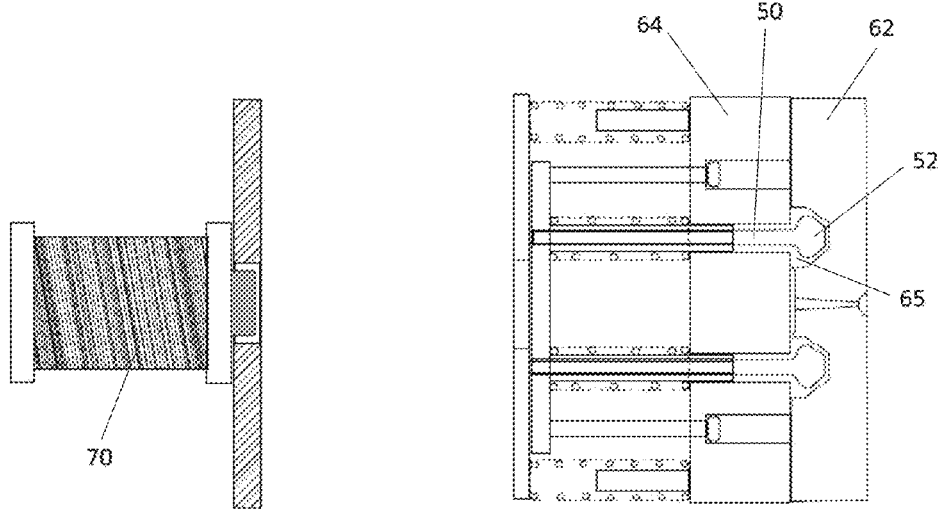
FIG. 10A to FIG. 10G show the method steps of manufacturing a dart head according to a further embodiment of the present invention.
Figure 10B:
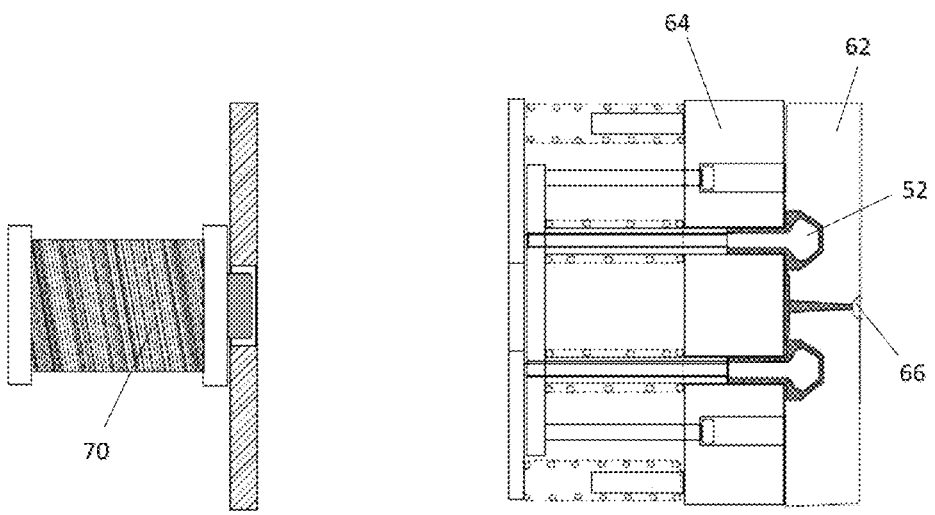

Referring to FIG. 10A, shown is the step for the first and the second female mold parts 62, 64 as being brought together to a closely adjacent position to substantially encase the male mold member 52 in the molding cavity 65. A flowable polymer will then be injected into the cavity 65 via an inlet 66, as shown in FIG. 10B. After solidification, a molded polymer dart head integrally formed with an enlarged head portion 24 and a stem portion 22 with an undercut opening 27 at its end will be formed.

Figure 10C:
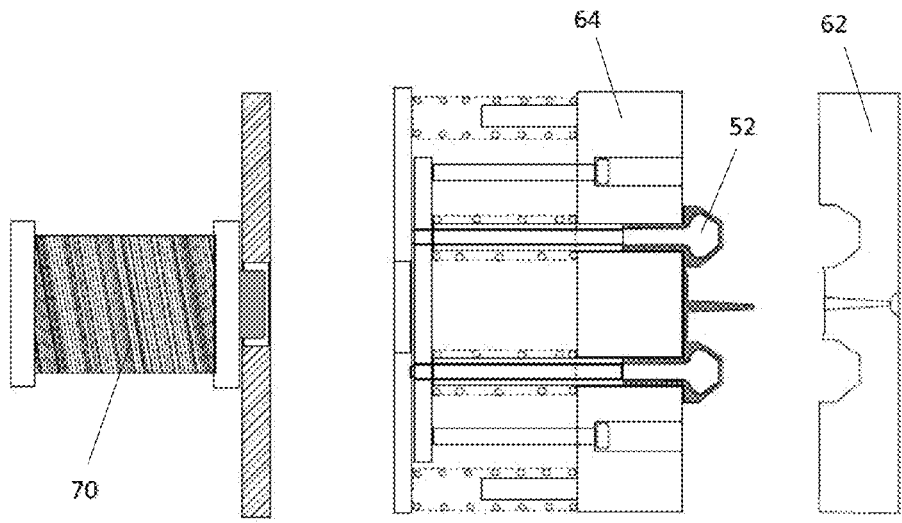

The second female mold part 64 and the male mold 50 will then be arranged to move away from the first female mold part 62, with the solidified, molded polymer being retained at the male mold member 52 of the male mold 50, as shown in FIG. 10C.

Figure 10D:
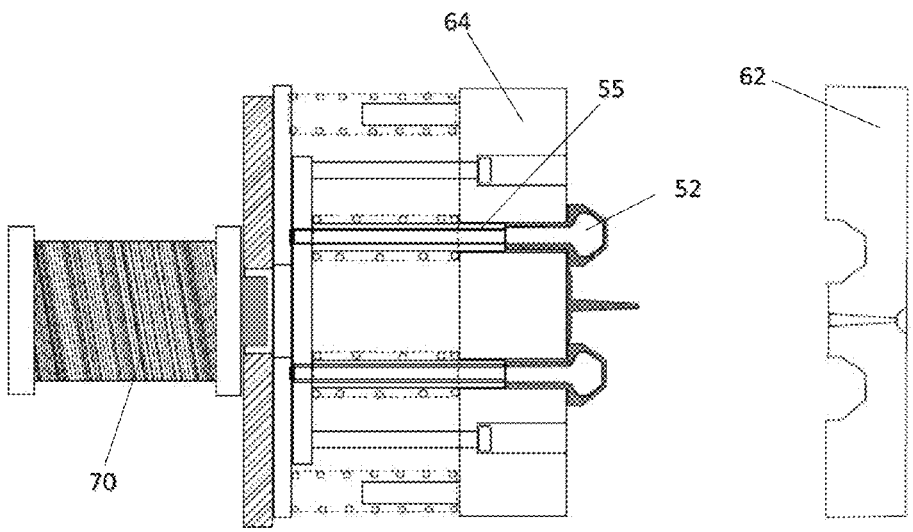
Figure 10E:
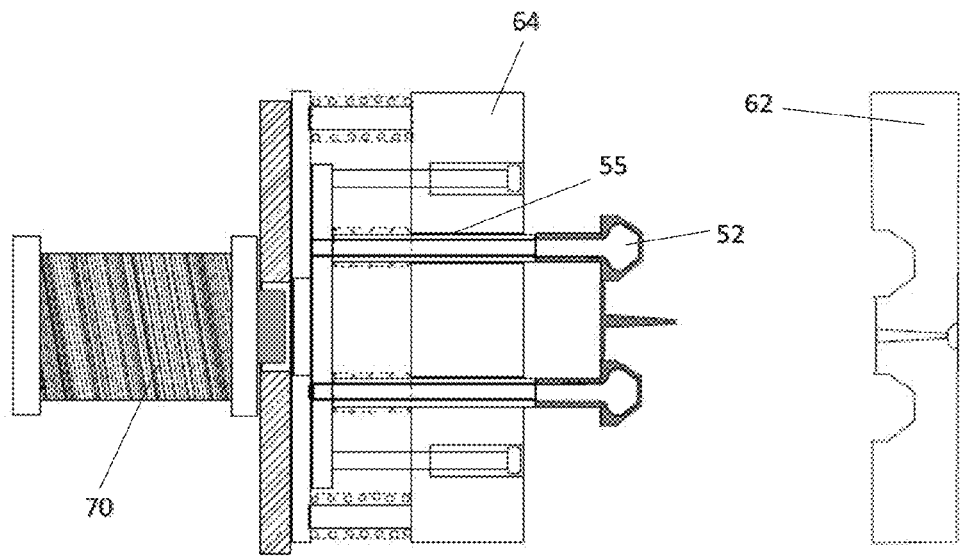
Figure 10F:
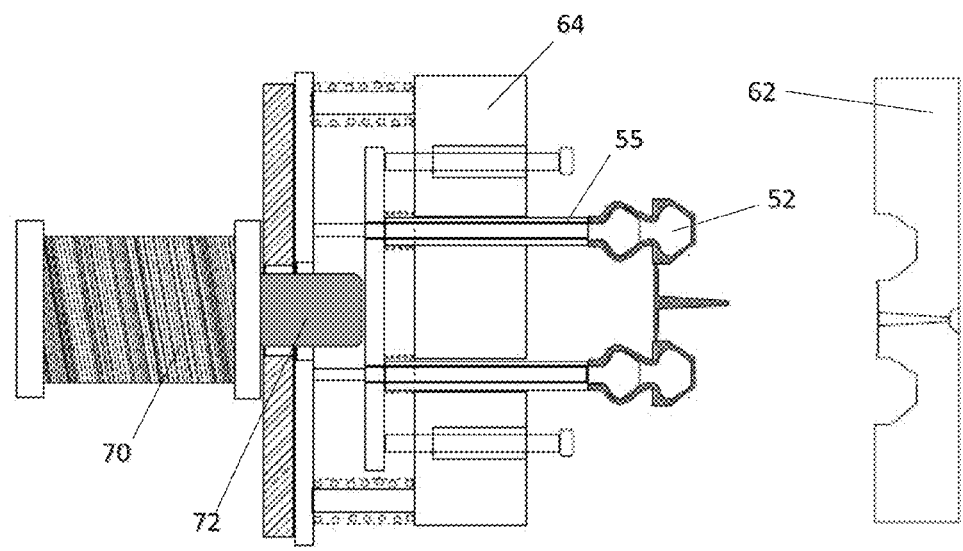
Figure 10G:
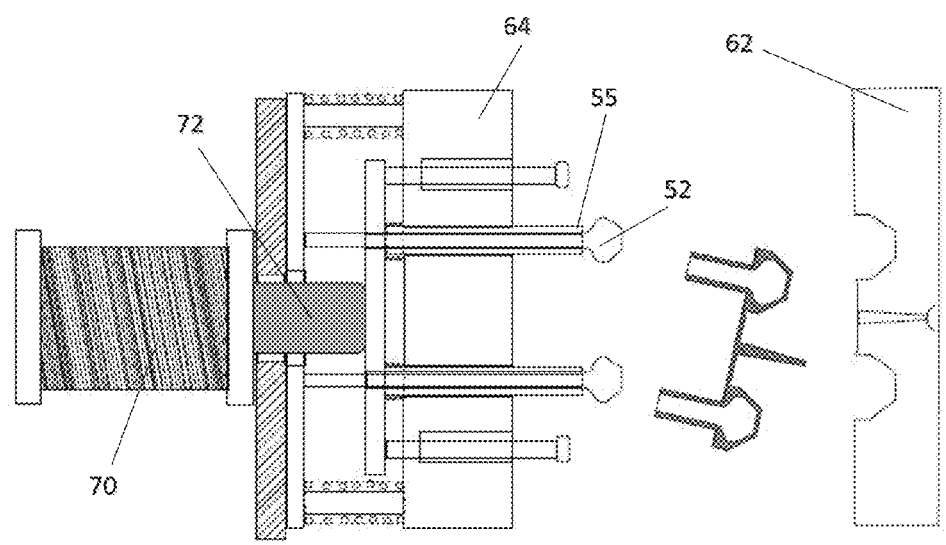

To begin the two-steps of the mechanically releasing process, the second female mold part 64 will first be arranged to engage with the electric solenoid 70 via one or more mechanical linkages, as shown in FIG. 10D. In this embodiment, the second female mold part 64 is adapted to slide backward, i.e. towards the solenoid 70 and away from the mold member 52 to thereby disengage the molded polymer from the second female mold part 64, see FIG. 10E. In the next step, the electric solenoid 70 will be actuated to impose a strong mechanical push via a pusher 72 towards the pushing means 55 to thereby mechanically push the molded polymer off of the mold member 52 of the male mold 50 via the undercut opening 27 of the molded dart head 20, as seen in FIGS. 10F and 10G. Again, it is essential for the molded polymer to be of sufficient resiliency such that the dart head 20 is resilient enough for the narrow step portion 24 and the undercut opening 27 to be deformable to thereby slide or pass over the enlarged head of the male mold member 52 (see FIG. 10F). The resiliency of the molded polymer also allows the released dart head 20 to quickly or instantly restore its original molded shape, without any tearing, ripping or fractures to the structure (see FIG. 10G).

In yet another embodiment, the dart head 20 of the toy dart 10 may have at least the hollow stem portion 22 of the integrally formed body 23 being made up of a material of sufficient resiliency, such that the stem portion 22 can be resiliently expandable or inflatable by, for example, a fluid stream such as but not limited to, pressurized gas or air introduced or injected into the body 23. The inflated stem portion 22 may define at least one second transverse internal stem dimension ($D_4$), which is larger than the first transverse internal head dimension ($D_1$). Preferably, the hollow head portion 24 of the integrally formed body 23 may be formed of the same resilient material or different material but of similar resiliency to that of the hollow stem portion 22, such that the head portion 24 is also expandable or inflatable by the inflating fluid stream to define at least one second transverse internal head dimension ($D_3$), with the second transverse internal head dimension ($D_3$) being larger than the first transverse internal head dimension ($D_1$).

Once the inflating fluid stream is removed or released, the sufficient resiliency of the material or materials allow the inflated stem portion 22 or the inflated body 23 to resiliently restore to their original, uninflated dimensions, i.e. from the second transverse internal head dimension ($D_3$) to the first transverse internal head dimension ($D_1$); and from the second transverse internal stem dimension ($D_4$) to the first transverse internal stem dimension ($D_2$), without any tearing, ripping or fractures to the structure.

The resiliency and the inflatable nature of the stem portion 22 or the body 23 of the dart head 20 is of particular significance to allow manufacturing of the dart head 20 by an pressurized air-assisted, injection molding process according to the present invention. Similar to the above described processes of FIGS. 9A to 9G and 10A to 10G, the pressurized air-assisted process negates the manual releasing or detaching step of the molded dart head from the mold, and more specifically, the male mold after the molding process. An embodiment of the pressurized air-assisted, injection molding process of the present invention is illustrated in FIGS. 11A to 11H, and is described below.

Figure 11A:
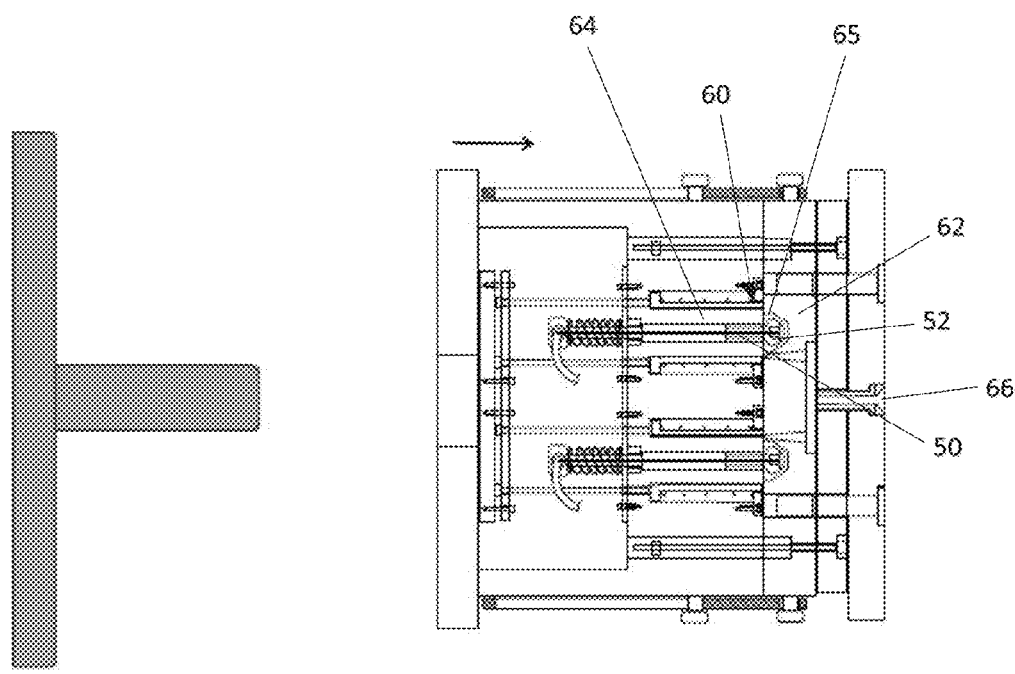
FIG. 11A to FIG. 11H show the method steps of manufacturing a dart head according to a further embodiment of the present invention.
Figure 11B:
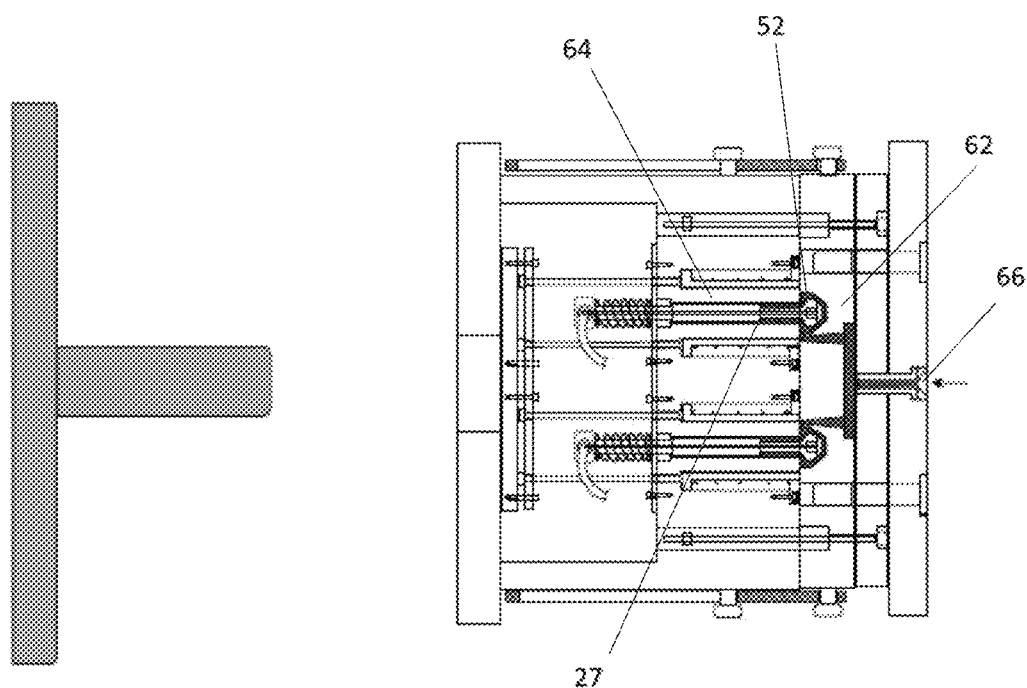

FIG. 11A shows the step for the female mold 60, which comprises the first and the second female mold parts 62, 64, as being brought together to a closely adjacent position to substantially encase the male mold member 52 of the male mold 50 in the molding cavity 65. A flowable polymer will then be injected into the cavity 65 via an inlet 66 for molding, as shown in FIG. 11B. After solidification, a molded polymer dart head integrally formed with an enlarged head portion 24 and a stem portion 22 with an undercut opening 27 at its end will be formed.

Figure 11C:
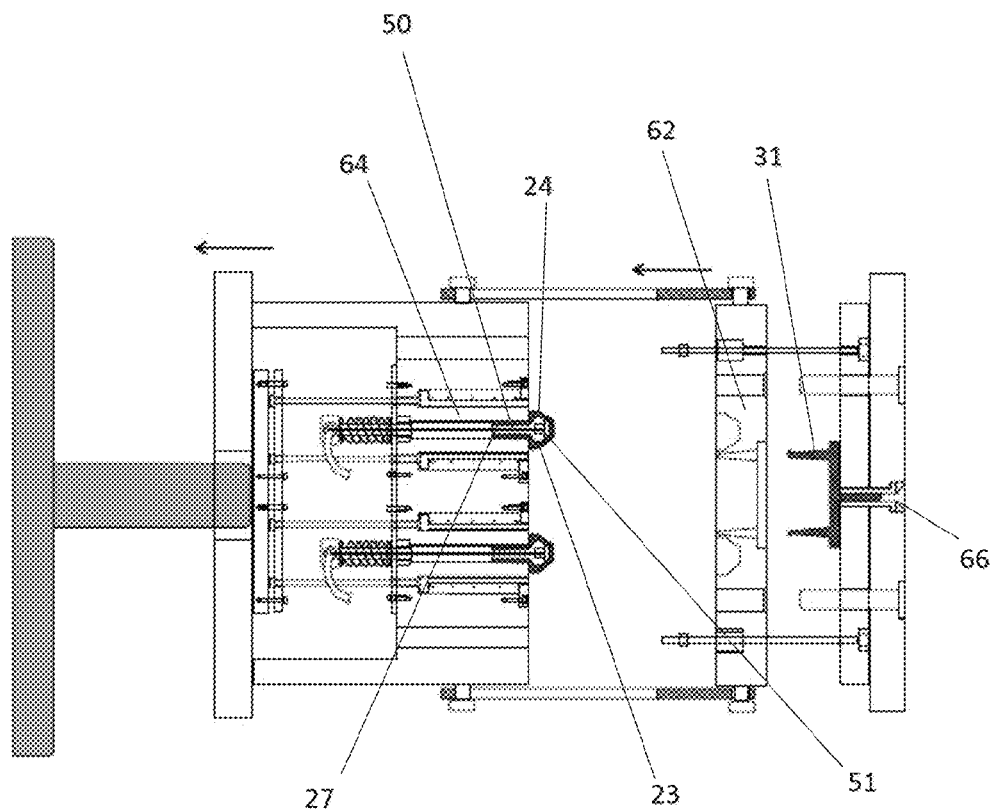
Figure 11D:
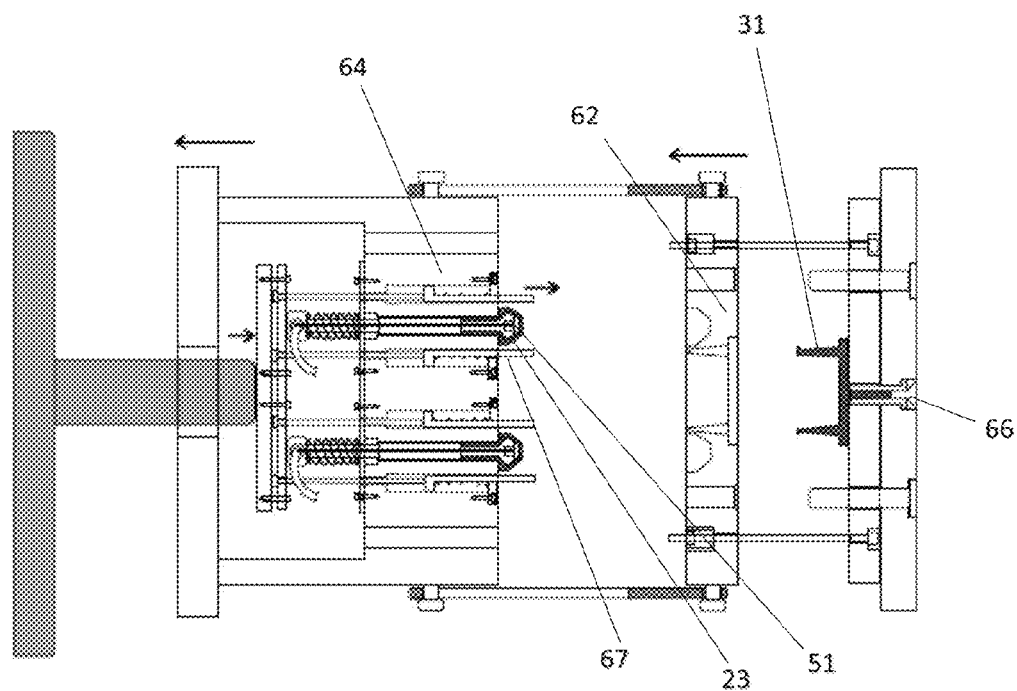
Figure 11E:
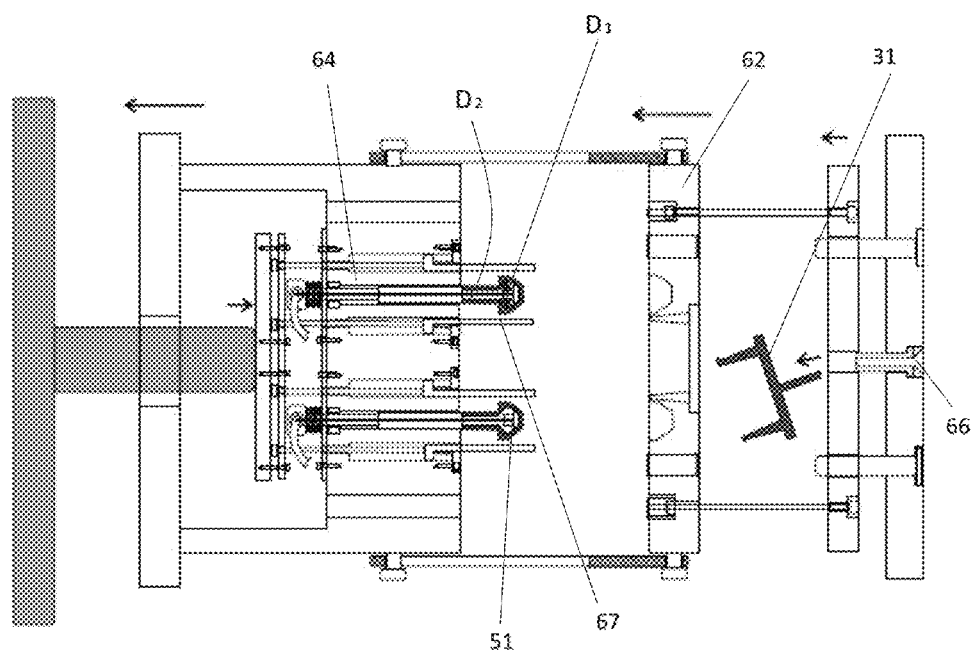

The second female mold part 64 and the male mold 50 will then be arranged to move away from the first female mold part 62, with the solidified, molded polymer dart head 20 being retained at the male mold member 52 of the male mold 50, as shown in FIG. 11C. In this embodiment, the movement of the second female mold part 64 and the male mold 50 away from the first female mold part 62 also detaches the unwanted, residual molded parts such as the sprue 31 from the molded dart head 20. This automatic and mechanical detaching step is advantageous to negate any secondary, manual degating step to detach the sprue 31 from the molded dart head 20. The detached sprue 31 may further be released and discarded by, for example, mechanically separating the first female mold part 62 from the sprue 31, as shown in FIG. 11C, and subsequently, mechanically pushing the sprue 31 off from the inlet 66, as shown in FIG. 11E.

Figure 11F:
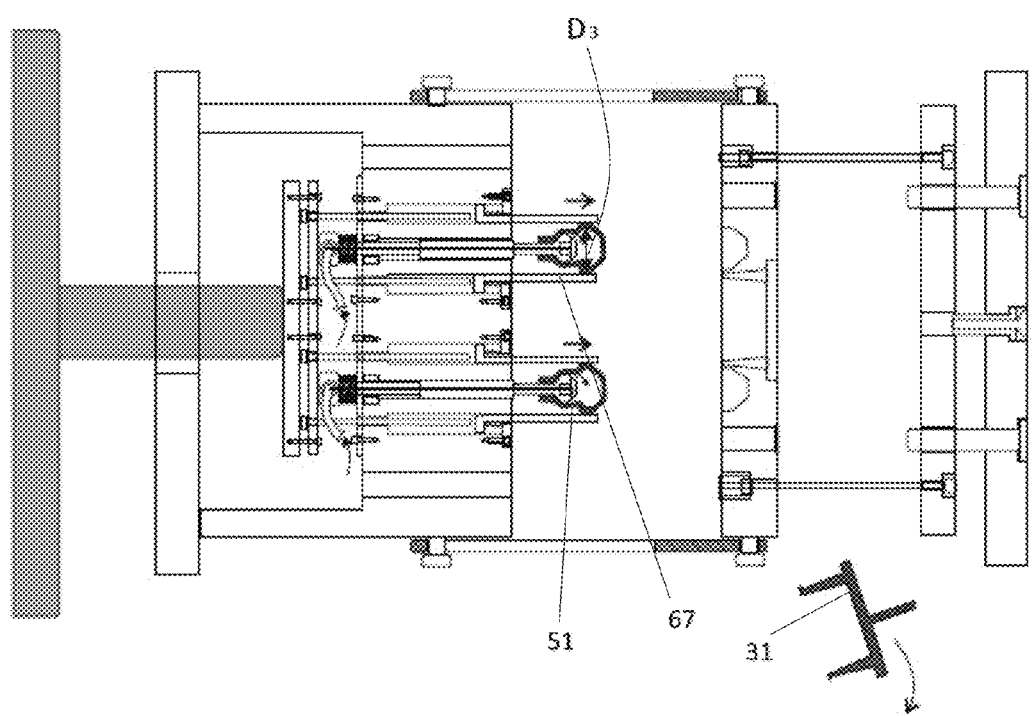
Figure 11G:
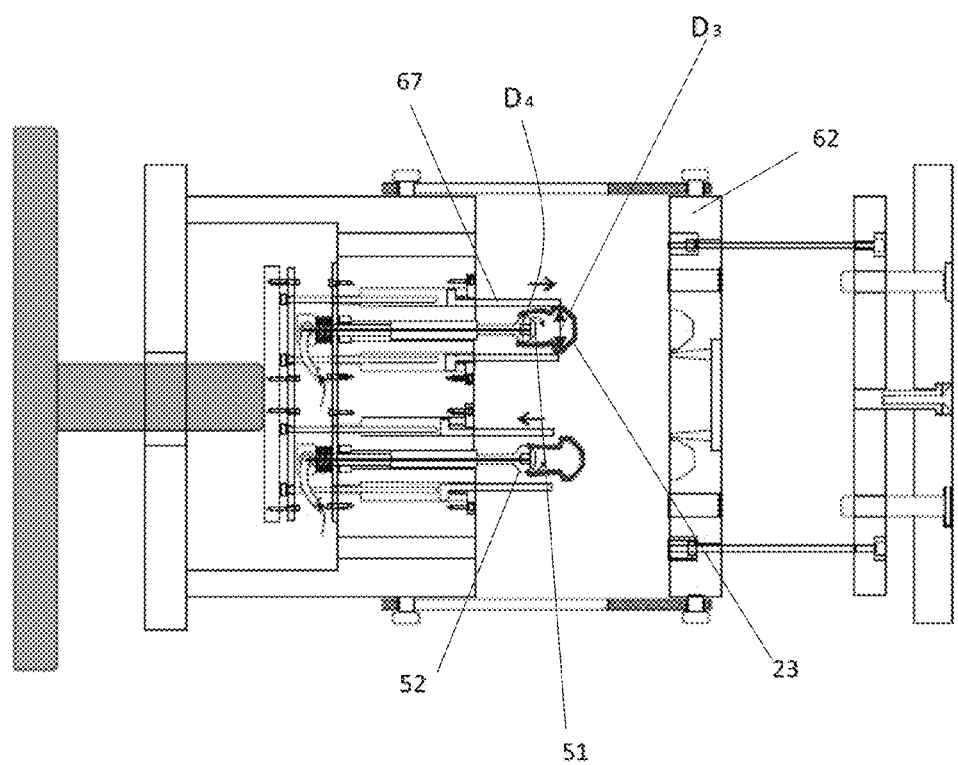
Figure 11H:
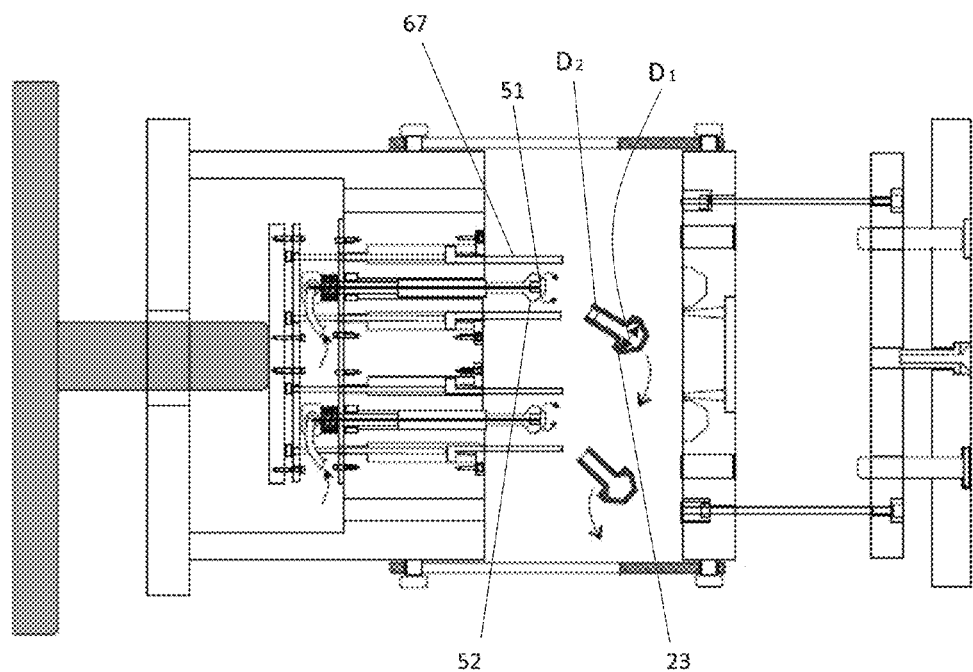

In this specific embodiment, the male mold 50 and preferably, the male mold member 52 of the male mold 50 is provided with a nozzle or gas outlet 51 adapted to inject or introduce a fluid stream such as pressurized gas or air into the internal cavity of the molded dart head 20, i.e. the fluidly connected head cavity 26 of the head portion 24, and the stem cavity 28 of the stem portion 22. Particularly, the integrally formed body 23 of the molded dart head 20 is of sufficient resiliency, such that it can be resiliently expanded by the injected pressurized air, and thus detached from the surface of the male mold 50. FIGS. 11F and 11G show the expansion of the dart head body 23 by the injected pressurized air, with the first transverse internal head dimension ($D_1$) of the internal cavity expanded to become the second transverse internal head dimension ($D_3$), and the first transverse internal stem dimension ($D_2$) of the internal cavity expanded to become the second transverse internal stem dimension ($D_4$). Preferably, the expanded internal cavity has a size larger than the male mold 50, and more specifically, the enlarged head of the male mold member 52 of the male mold 50. The emission of the pressurized air further provides a pushing force to effectively blow the expanded dart head body 23 off from the male mold 50, as shown in FIG. 11H, without the need of any secondary, manual detaching or mechanical pushing steps.

Optionally, a restricting means 67 can be provided to surround the molded polymer dart head 20 to restrict or limit the expansion or inflation of molded dart head 20 prior to the inflation step. For example, the restricting means 67 can be arranged in the form of a cylindrical tube which surrounds and extends along the length of the dart head body 23, as shown in, for example, FIGS. 11D to 11H. The cylindrical restricting means 67 may comprise an internal wall spaced from the dart head body 23 for a sufficient distance, such that the body 23 can be inflated to a sufficient extent to overcome the enlarged head of the male mold member 52. At the same time, the cylindrical restricting means 67 is adapted to prevent the molded dart head body 23 from being overly inflated which may lead to eruption of the body 23. The restricting means 67 may further be provided with a switch or a sensor, such as a touch sensor triggerable to discontinue the gas supply when the body 23 is expanded to a required size to be in contact with the internal wall of the restricting means 67, for example. In one further embodiment, the pressurized gas may also be introduced prior to the solidifying step of the dart head body 23 in a controlled manner, for example, before the complete solidification of the injected, flowable polymer, to thereby assist in distributing the flowable polymer within the mold cavity 65 and/or adjusting the thickness of the molded body 23, particularly the thickness of the head portion 24, for example.

The present invention is advantageous in that it provides a hollow and resilient dart head for use in a foam dart. The dart head is of sufficient resiliency such that, upon impact on a surface such as a target, the hollow head portion of the dart head is adapted to resiliently deform, flatten or collapse to thereby increase the area of contact, i.e. the impact surface with the target. As a result, the force of impact imposed on the struck target can be significantly reduced to lower the risk of injuries and thus to enhance safety of the game. The hollow stem portion of the dart head also allows adjustment of the dart weight by receiving a weight carrying insert, which facilitates customization of flight performance of the resulting toy dart as well as possible control of the rate of deformation of the hollow head portion during an impact on a target. The present invention also provides a relatively quick and easy manufacturing process to integrally mold the hollow dart head, with the molded material being resilient enough to allow the integrally formed dart head to be easily released from the molding equipment by, for example, a simple two steps, mechanically pushing and/or pulling process, or a pressurized air assisted detaching process. The processes are beneficial in ways that they negate the secondary, manual releasing, detaching or degating step of the molded dart head, which significantly streamline the manufacturing process.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such prior art does not constitute an admission that the prior art forms a part of the common general knowledge in the art.

The invention claimed is:

1. A dart head for a toy dart, comprising:
a body having a hollow stem portion integrally formed in a single, continuous piece with and longitudinally extending from an enlarged, hollow head portion; the head portion and the stem portion being fluidly connected, with the head portion defining at least one first transverse internal head dimension, and the stem portion defining at least one first transverse internal stem dimension; wherein the at least one first transverse internal head dimension being larger than the at least one first transverse internal stem dimension;
wherein at least the hollow stem portion of the body is formed of a resilient material, said material being sufficiently resilient to enable the hollow stem portion to be inflated by a fluid to define at least one second transverse internal stem dimension which is larger than the first transverse internal head dimension.

2. The dart head according to claim 1, wherein the hollow head portion of the body is formed of the same resilient material as the hollow stem portion, such that the hollow head portion is inflatable by a fluid to define at least one second transverse internal head dimension which is larger than the first transverse internal head dimension.

3. The dart head according to claim 2, wherein the hollow head portion and the hollow stem portion, once inflated, are resiliently restorable to their uninflated dimensions, when the fluid is released.

4. The dart head according to claim 1, wherein the fluid comprises a pressurized gas.

5. The dart head according to claim 1, wherein the hollow head portion is resilient such that, upon impact on a surface, the head portion is adapted to resiliently deform to thereby increase area of contact between the head portion and the surface.

6. The dart head according to claim 1, wherein the body is formed of a resilient polymeric material.

7. The dart head according to claim 1, further comprising an insert adapted to be received at the hollow stem portion of the body.

8. The dart head according to claim 7, wherein the insert is partially hollow.

9. The dart head according to claim 7, wherein the insert comprises a weight member.

10. A toy dart comprising a dart body connectable with the dart head in accordance with claim 1.

11. The toy dart according to claim 10, wherein the dart body is formed of at least one foam material.

12. The toy dart according to claim 10, wherein the dart body is partially hollow.

13. The toy dart according to claim 10, wherein the dart body is adapted to receive the stem portion of the dart head to thereby connect with the dart head.

* * * * *